Figures 1, 2, 3, 4, 5, 6, 7:
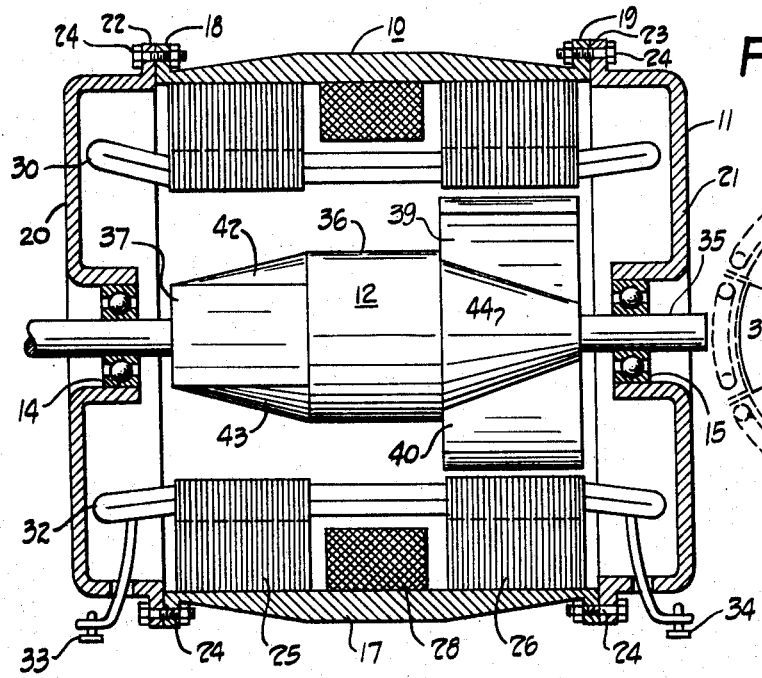

June 18, 1968  J. N. ELLIS  3,389,281
ROTOR FOR INDUCTOR ALTERNATOR
Filed Aug. 23, 1965

INVENTOR.
JAMES N. ELLIS

ATTORNEYS.

United States Patent Office 3,389,281
Patented June 18, 1968

3,389,281
ROTOR FOR INDUCTOR ALTERNATOR
James N. Ellis, Glendale, Calif., assignor to Lear Siegler, Inc., Santa Monica, Calif., a corporation of Delaware
Filed Aug. 23, 1965, Ser. No. 481,757
7 Claims. (Cl. 310—168)

This invention relates to electrical generators and more particularly to an improved inductor alternator.

Inductor alternators are well known in the art. Their use, however, has been restricted to industrial applications where size and weight are of little consequence because of the relatively large size and weight as compared to other types of alternators which produce comparable power. These particular generators, however, are particularly useful where the power requirements include low voltage, high current demands. Their use could be increased if the output power per unit of generator weight could be increased.

Accordingly, it is an object of this invention to provide an improved inductor alternator.

It is another object of this invention to provide an inductor alternator whose efficiency is appreciably increased while its weight is decreased as compared to other types of alternators.

It is yet a further object of this invention to provide an inductor alternator which is lighter in construction while providing more power output than other types of inductor alternators.

Briefly, in accordance with aspects of this invention, an inductor alternator is provided with an improved rotor construction which substantially increases the power output of the generator while reducing the weight of the rotor. Priorly, cylindrical rotors were employed on which a series of poles of one polarity were positioned in a common plane lying transversely of the axis of the rotor and a like plurality of the opposite type poles were peripherally spaced relative to the rotor axis in a second plane lying transversely of the rotor axis.

In accordance with this invention, the rotor shaft is tapered in the region of the planes containing the poles to reduce the mass of the rotor axis and to reduce the resulting flux leakage in the region of the planes containing the rotor poles. Because the cross-sectional area of the rotor shaft is larger in the region intermediate the poles, a relatively low reluctance path is provided between the poles. However, because of the tapering rotor axis in the planes containing the rotor poles, substantially all of the flux will be transferred from the rotor axis to the pole pieces. These novel concepts can be employed in alternators having a variety of numbers and shapes of poles. For example, they may be employed in a four-pole generator and in other illustrative embodiments, the same concepts can be employed in six-pole or eight-pole alternators. Generally speaking, however, the concepts include employing a cylindrical section of rotor shaft between the pole groups and a plurality of longitudinal sections of frustums in the planes containing the pole groups which taper to reduce the shaft volume toward the outboard ends. This taper increases the distance between the shaft and the stator in the region of the rotor poles and thereby reduces the amount of ineffective flux in the interpolar region.

Still further objects and advantages relate to structural details and novel combinations and arrangements of parts which will become apparent as the description proceeds. This description is made in conjunction with the accompanying drawing forming a part of the specification. Like parts, throughout the several views are indicated by the same references.

In the drawings:
FIGURE 1 is a view in elevation, and partly in section, of a four-pole inductor alternator according to one illustrative embodiment of this invention;
FIGURE 2 is an end view of the rotor of FIGURE 1;
FIGURE 3 is a side elevational view of a rotor illustrating an alternative embodiment of four-pole rotor which may be employed in the stator shown in FIGURE 1;
FIGURE 4 is an end view of the rotor of FIGURE 3;
FIGURE 5 is a side elevational view of a six-pole rotor according to one illustrative embodiment of this invention which may be employed in the stator of FIGURE 1;
FIGURE 6 is an end view of the rotor of FIGURE 5; and
FIGURE 7 is a perspective view of an eight-pole rotor in accordance with yet another illustrative embodiment of this invention.

Referring now to the drawing, FIGURE 1 is a view in elevation, partly in section, of a four-pole inductor alternator 10 according to one illustrative embodiment of this invention, and FIGURE 2 is an end view of the rotor of FIGURE 1. Alternator 10 includes a housing 11 which rotatably supports a rotor 12 by means of sets of bearings 14, 15. The housing 11 includes a generally cylindrical iron yoke 17 having a pair of annular flanges 22, 23, 18, 19 on opposite ends thereof and a pair of end members 20, 21 having mating flanges which matingly engage the flanges 18, 19 respectively, and are secured thereto by means of nut and bolt assemblies 24.

Within the iron yoke 17 a pair of stator laminations 25, 26 are mounted in planes which intersect the opposite ends of the rotor 12. Between the stator laminations 25, 26 a field coil 28 is located having its axis coincident with the axis of the rotor 12 for the purpose of producing a magnetic field through the rotor 12, yoke 17 and the stator laminations 25, 26 when the field 28 is excited by direct current. The stator is provided with a plurality of coils such as the coils 30, 32 each of which coils encircles portions of each of the projecting stator laminations 25, 26. Coils 30, 32 and the remaining coils shown in dotted outline in FIGURE 2 are serially connected to suitable output terminals 33, 34 as shown, from which the alternating current is fed to a suitable load, not shown.

The rotor 12 includes a shaft 35 rotatably journaled in the bearings 14, 15. The main body of the rotor 12 is an armature having a substantially cylindrical portion 36 which is centrally positioned with its mid-point in the same plane as the field coil 28. One each of the outboard sides of the main body 36 of rotor 12 pairs of poles are positioned. On one end of rotor 12 a pair of north poles 37, 38 are provided and on the opposite end of the main body portion 36 a pair of south poles 39, 40 are provided. In order to provide a relatively low magnetic reluctance between north poles 37, 38 and south poles 39, 40 the central cylindrical portion 36 of the rotor 12 has a diameter at least half as large as the diameter of the rotor poles 37, 38, 39 and 40 and preferably at least twice as large as the diameter of shaft 35. Also for the purpose of decreasing the magnetic reluctance between the poles of the rotor 12 and the stator laminations 25 and 26, the poles preferably taper outwardly as best seen in FIGURE 2. Advantageously the body of the rotor between the rotor poles and the central cylindrical portion 36 tapers toward the rotor axis in the direction of the outboard ends of the rotor to provide frustoconical segments 42, 43, 44 and 45 to provide a relatively high magnetic reluctance path between the segments 42, 43, etc., and the stator laminations. Although these tapered portions are shown in the form of longitudinal sections of frustums, it is not essential that they be conical but this surface configuration is preferred because it provides symmetry with respect to the axis of the rotor 12.

If the rotor body were entirely cylindrical and of the same diameter as the segment 36 in the region of the poles 37, 38, 39 and 40, the unwanted flux passing from the rotor to the stator in the region between poles of like polarity would be significant and would be of the order of 7 to 10% in a practical, useable design. This unwanted or leakage flux would generate a voltage opposite to the output voltage in the output windings and reduce the output of the machine. However, by employing the tapered rotor structure in the region of the poles, a significant reduction of unwanted flux passing from the rotor to the stator in the region between the poles of like polarity is obtained. The rotor increases the maximum output of a given generator over that output obtainable with the conventional rotor of comparable pole-size. The improvement in output power over a generator of comparable weight without the tapered rotor is of the order of 15%. Further, by providing a conical tapering section which has its larger diameter substantially equal to the diameter of the central portion of the rotor 12 and having this tapered portion taper to a diameter just sufficient to provide a base for the rotor poles, a uniform path of relatively low reluctance is provided between the stator laminations 25 and 26 through the rotor structure.

FIGURES 3 and 4 are side elevational and end views respectively of another illustrative embodiment of rotor according to this invention, which rotor structure is also a four-pole structure and which may be substituted for the rotor 12 of FIGURE 1. In FIGURES 3 and 4 a rotor 50 is provided with a central section 52 having a diameter substantially two and one-half times the diameter of shaft 53 and having a diameter which is equal to at least half and preferably at least two-thirds the diameter of the rotor poles 55, 56, 57 and 58. Each of the pairs of poles 55, 56, 57 and 58 are connected together by sections of the rotor which terminate in substantially straight lines such as the parallel lines 60, 61 which define the termination of a pair of frusto-conical portions 62 and 63. On the opposite end of the rotor 50 a pair of longitudinal sections of frustums 64, 65 connect the poles 55, 56 in a manner identical to that of the conical sections 62 and 63. The embodiment of FIGURES 3 and 4 is a preferred embodiment as compared to the embodiment of FIGURES 1 and 2, primarily because it produces a more uniform flux path between the stator laminations 25 and 26 and because the wider pole faces on the ends of the poles provide a lower reluctance path than those of rotor 12.

FIGURES 5 and 6 are side elevational and end views, respectively, of a six-pole rotor according to another illustrative embodiment of this invention. This rotor could be mounted in a suitable stator framework similar to that shown in FIGURE 1 except that a different number and spacing of stator laminations and stator coils would be employed. Similarly a different number of pairs of output coils similar to the coils 30, 32 of FIGURE 1 would be employed in a manner well known in the art. FIGURES 5 and 6 show a rotor 70 secured to a suitable shaft 71 and having a central cylindrical section 72 which supports six poles, three on each end thereof. For example, on the left-hand end of the rotor 70 a group of poles 73, 74 and 75 are located each positioned 120° from the other two poles relative to the armature axis. These poles are separated by conical segments or longitudinal segments of frustums such as the segment 76. Preferably the larger diameter of these segments is substantially equal to the diameter of the central cylindrical portion 72 and the segments taper to a diameter at least one and one-half times the diameter of the shaft 71. On the opposite end of the rotor 70 a group of poles 77, 78 and 79 are positioned at 120 mechanical degrees apart and each separated by a longitudinal section of a frustum such as the segments 80, 81 and 82. In this particular embodiment each of the poles is characterized by substantially parallel side walls such as the parallel side walls 83, 84 on the pole 77.

FIGURE 7 is a view in perspective of an eight-pole rotor 88 which may be employed in a suitable stator housing of the type generally shown in FIGURE 1. The rotor 88 is mounted on a shaft 89 and includes a group of four poles 90, 91, 92 and 93 on one end thereof and a corresponding group of four poles 94, 95, 96 and 97 on the opposite end relative to the central cylindrical portion 98. Each of these poles is characterized by substantially parallel side walls and a curved or generally cylindrical outer surface with tapered portions such as the portions, 100, 101 and 102 separating the pairs of poles.

In each of the illustrative examples the poles of one polarity are positioned circumferentially intermediate the poles of the opposite polarity on the opposite ends of the rotor, as best seen in FIGURES 2, 4 and 6. The number of stator coils is equal to or a multiple of the number of armature poles of one polarity, as indicated in dotted outline in FIGURES 2, 4 and 6. In the embodiment of FIGURES 1 and 2, these are eight serially connected coils, equally circumferentially positioned relative to the armature, each coil encircling projecting portions of both sets of laminations 25 and 26. The rotor in FIGURE 4 is employed in a stator having four serially connected stator coils, each coil having a transverse dimension occupying slightly less than 90° relative to the armature axis. The stator of FIGURE 6 employs twelve serially connected coils, as shown in dotted outline. The rotor of FIGURE 7 is preferably employed in a stator having eight coils but may also be employed in a stator having four coils.

The principles of the present invention may be utilized in various ways, substitution of parts and changes in construction being resorted to as desired, it being understood that the embodiments shown in the drawing and described above are given merely for the purpose of explanation and illustration without intending to limit the scope of the claims to the specific details disclosed.

I claim:

1. In an inductor alternator the combination comprising:

a housing;
stator means in said housing including at least two sets of laminations and a plurality of stator windings each coupled to at least one set of said laminations; and
rotor means rotatably mounted in said housing including a shaft and an armature on said shaft having
a longitudinally central section, at least two groups of poles on said shaft, one on each side of said central section, each group including a plurality of poles equally circumferentially spaced relative to the armature axis and tapered sections between adjacent poles of each group, each of said tapered sections tapering from the edge of said cylindrical section toward the armature axis.

2. In an inductor alternator the combination comprising:

a housing;
stator means in said housing including at least two sets of laminations and a plurality of stator windings, each coupled to at least one set of said laminations; and
rotor means in said housing including a shaft, said armature having
a longitudinally central cylindrical section, at least two groups of poles on said shaft, one on each side of said central section, each group including a plurality of poles equally circumferentially spaced relative to the armature axis and tapered sections between adjacent poles of each group, each tapered section being a longitudinal section of a frustum and tapering from the edge of said cylindrical section toward the armature axis.

3. In an inductor alternator the combination comprising:
 a housing;
 stator means in said housing including at least two sets of laminations and a plurality of stator windings each coupled to at least one set of said laminations; and
 rotor means rotatably mounted in said housing including a shaft and an armature mounted on said shaft and having
  a central cylindrical section, at least two groups of poles on said shaft, one group on each side of said central section, each of said poles having sides with portions which extend radially relative to said armature axis and tapered sections between adjacent poles of each group, each tapered section comprising a longitudinal section of a frustum.

4. In an inductor alternator the combination comprising:
 a housing;
 stator means in said housing including a plurality of laminations and a plurality of stator windings, each winding coupled to at least a portion of said laminations; and
 rotor means rotatably mounted in said housing including a shaft and an armature mounted on said shaft and having
  a longitudinally central cylindrical section, at least two groups of poles on said shaft, each pole having opposed parallel sides and tapered sections between adjacent poles of each group, each of said sections tapering toward the armature axis in an outboard direction from said cylindrical section.

5. In an inductor alternator the combination comprising:
 a housing;
 stator means in said housing including at least two sets of laminations, each set being positioned in a plane transverse to the housing axis and a plurality of stator windings, each coupled to at least one set of said laminations; and
 rotor means in said housing including a shaft and an armature mounted on said shaft and
  having a longitudinally central cylindrical section, at least two groups of poles on said shaft, one on each side of said central section, each pole group including two diametrically positioned poles the sides of which extend radially relative to said armature axis, the poles of one group being circumferentially spaced midway between the poles of the other group and tapered sections between adjacent poles of each group, each of said tapered sections tapering from the edge of said central section toward the armature axis in an outboard direction.

6. In an inductor alternator the combination comprising:
 a housing;
 stator means in said housing including at least two sets of laminations and a plurality of stator windings each coupled to both sets of said laminations; and
 rotor means rotatably mounted in said housing including
  a shaft and an armature mounted on said shaft and having a central cylindrical section, at least two groups of poles, each pole group including at least three poles and tapered sections between adjacent poles of each group, each tapered section tapering from a diameter substantially equal to the diameter of said cylindrical section toward the armature axis in an outboard direction.

7. In an inductor alternator the combination comprising:
 a housing;
 stator means in said housing including two sets of laminations and a plurality of stator windings each coupled to both sets of said laminations; and
 rotor means rotatably mounted in said housing including
  a shaft and an armature mounted on said shaft and having a longitudinally central section having a diameter at least two and one-half times the diameter of said shaft, two groups of poles on said shaft, one group on each side of said central section, each group including a plurality of poles equally circumferentially spaced relative to the armature axis and tapered sections between adjacent poles of each group, each of said tapered sections tapering from the edge of said cylindrical section toward the armature axis in an outboard direction.

References Cited

UNITED STATES PATENTS

| | | | |
|---|---|---|---|
| 594,145 | 11/1897 | Steinmetz | 310—168 |
| 2,073,760 | 3/1937 | Schou | 310—168 |
| 2,108,662 | 2/1938 | Fisher | 310—168 |
| 3,258,620 | 6/1966 | Imanuel | 310—168 |
| 3,321,652 | 5/1967 | Opel | 310—168 |

MILTON O. HIRSHFIELD, *Primary Examiner.*

L. L. SMITH, *Assistant Examiner.*